(12) United States Patent
Hosoda et al.

(10) Patent No.: US 11,401,199 B2
(45) Date of Patent: *Aug. 2, 2022

(54) GLASS PLATE

(71) Applicant: Nippon Electric Glass Co., Ltd., Shiga (JP)

(72) Inventors: Yohei Hosoda, Shiga (JP); Shingo Nakane, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 164 days.

This patent is subject to a terminal disclaimer.

(21) Appl. No.: 16/605,622

(22) PCT Filed: Feb. 27, 2018

(86) PCT No.: PCT/JP2018/007285
§ 371 (c)(1),
(2) Date: Oct. 16, 2019

(87) PCT Pub. No.: WO2018/193721
PCT Pub. Date: Oct. 25, 2018

(65) Prior Publication Data
US 2020/0123041 A1 Apr. 23, 2020

(30) Foreign Application Priority Data

Apr. 17, 2017 (JP) .............................. JP2017-081363
Jan. 31, 2018 (JP) .............................. JP2018-014352

(51) Int. Cl.
*C03C 3/087* (2006.01)
*B32B 17/10* (2006.01)

(52) U.S. Cl.
CPC ........ *C03C 3/087* (2013.01); *B32B 17/10064* (2013.01); *B32B 17/10761* (2013.01);
(Continued)

(58) Field of Classification Search
CPC ...... C03C 3/076–3/118; B32B 17/00–17/1099
See application file for complete search history.

(56) References Cited

U.S. PATENT DOCUMENTS

2013/0301118 A1 11/2013 Ogawa et al.
2015/0064411 A1 3/2015 Sasai et al.
(Continued)

FOREIGN PATENT DOCUMENTS

JP 64-8821 1/1989
JP 2001-151539 6/2001
(Continued)

OTHER PUBLICATIONS

International Search Report dated Apr. 24, 2018 in International (PCT) Application No. PCT/JP2018/007285.
(Continued)

*Primary Examiner* — Prashant J Khatri
(74) *Attorney, Agent, or Firm* — Wenderoth, Lind & Ponack, L.L.P.

(57) ABSTRACT

A glass sheet of the present invention is a glass sheet for producing a glass-resin composite through integral combination with a resin sheet, the glass sheet including as a glass composition, in terms of mol %, 40% to 80% of $SiO_2$, 5% to 30% of $Al_2O_3$, 0% to 20% of $Li_2O+Na_2O+K_2O$, 3% to 35% of MgO, and 0% to 15% of CaO+SrO+BaO.

9 Claims, 1 Drawing Sheet

(52) U.S. Cl.
CPC ..... *B32B 2250/03* (2013.01); *B32B 2307/412* (2013.01); *B32B 2329/06* (2013.01); *B32B 2605/08* (2013.01)

(56) References Cited

U.S. PATENT DOCUMENTS

| | | | |
|---|---|---|---|
| 2015/0314571 A1 | 11/2015 | Cites et al. | |
| 2017/0327408 A1* | 11/2017 | Nomura | ................. B32B 9/041 |
| 2018/0141850 A1* | 5/2018 | Dejneka | ............ B32B 17/10761 |
| 2020/0023617 A1* | 1/2020 | Hosoda | ................ B32B 27/308 |
| 2020/0122433 A1* | 4/2020 | Hosoda | .................. B32B 7/027 |

FOREIGN PATENT DOCUMENTS

| | | | | |
|---|---|---|---|---|
| JP | 2004-196184 | 7/2004 | | |
| JP | 2012-144217 | 8/2012 | | |
| JP | 2015-143182 | 8/2015 | | |
| JP | 2016-8161 | 1/2016 | | |
| JP | 2016-52990 | 4/2016 | | |
| WO | WO-2016125787 A1 * | 8/2016 | ............. | G02B 5/226 |
| WO | WO-2016149861 A1 * | 9/2016 | ............. | B32B 17/06 |

OTHER PUBLICATIONS

International Preliminary Report on Patentability and Written Opinion of the International Search Authority dated Apr. 24, 2018 in International (PCT) Application No. PCT/JP2018/007285.

\* cited by examiner

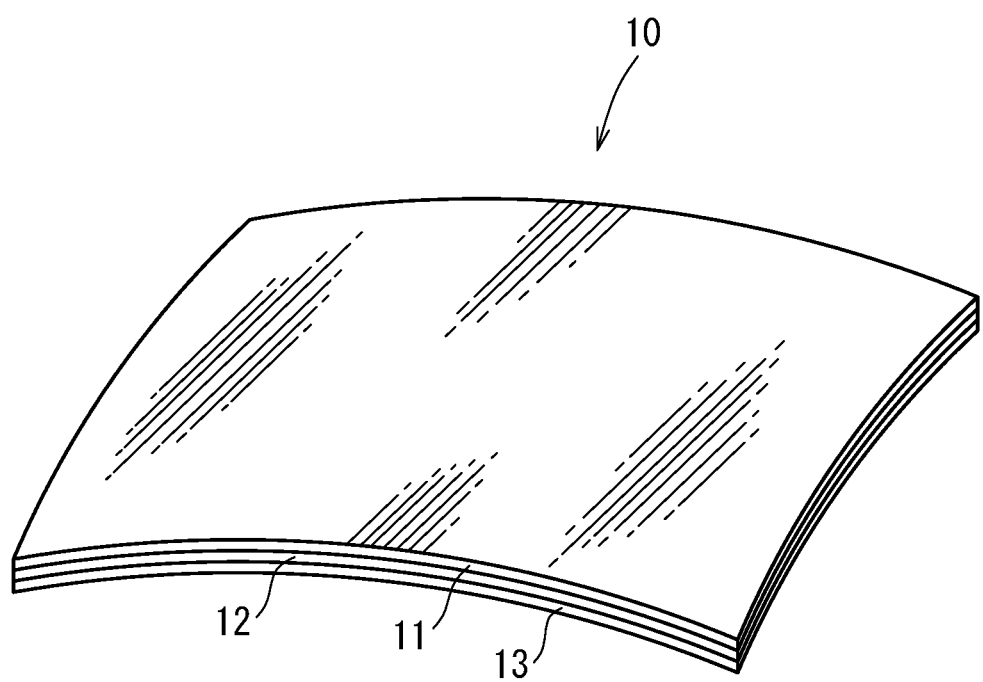

GLASS PLATE

TECHNICAL FIELD

The present invention relates to a glass sheet for producing a glass-resin composite through integral combination with a resin sheet, and more particularly, to a glass sheet to be used for a glass-resin composite suitable as a windshield or a door glass of an automobile.

BACKGROUND ART

In general, a laminated glass, in which a plurality of soda lime glass sheets are integrally combined with each other via an organic resin intermediate layer, is used as a window glass (for example, a windshield) of a vehicle or the like. For the purpose of weight saving, a glass-resin composite, in which a plurality of soda lime glass sheets and a resin sheet are integrally combined with each other via an organic resin intermediate layer, is sometimes used (see Patent Literatures 1 to 4).

The soda lime glass sheet to be used for a window glass of a vehicle or the like has a function of deforming a shape of a tip of a scattered piece, such as a flying stone, while the vehicle or the like is moving, to thereby increase impact resistance against the scattered piece and thus attenuate collision energy with the scattered piece.

However, the soda lime glass sheet cannot be said to have a sufficient increasing effect on the impact resistance against the scattered piece. Under existing circumstances, the impact resistance against the scattered piece is increased by increasing the thickness of the soda lime glass sheet or increasing the number of sheets to be laminated. However, this entails increases in thickness and weight of a window glass.

In view of the foregoing, in order to increase the impact resistance against the scattered piece, investigations have been made on use of a crystallized glass sheet instead of the soda lime glass sheet. For example, a crystallized glass sheet in which a $Li_2O$—$Al_2O_3$—$SiO_2$-based crystal, such as a β-quartz solid solution ($Li_2O.Al_2O_3.nSiO_2$ [where n≥2]), is deposited as a main crystal has been investigated.

CITATION LIST

Patent Literature

Patent Literature 1: JP 2012-144217 A
Patent Literature 2: JP 2004-196184 A
Patent Literature 3: JP 2001-151539 A
Patent Literature 4: JP 01-8821 U

SUMMARY OF INVENTION

Technical Problem

Incidentally, when the crystallinity of crystallized glass is increased, the hardness of the crystallized glass is increased, and thus the collision energy with the scattered piece can be attenuated. However, a deposited crystal inhibits softening and deforming, and hence curving work (e.g., bending work) becomes difficult, with the result that such glass is not applicable to a windshield of an automobile or the like. In addition, the collision energy with the scattered piece can also be attenuated by increasing the thickness of the crystallized glass. However, in this case, a window glass is increased in weight, and may also be impaired in transparency.

Thus, the present invention has been made in view of the above-mentioned circumstances, and a technological object of the present invention is to devise a glass sheet which is excellent in curving workability, and which can effectively attenuate collision energy with a scattered piece even when having a small thickness and a low crystallinity.

Solution to Problem

The inventors of the present invention have found that the above-mentioned technical object can be achieved by strictly restricting the range of the glass composition of a glass sheet. Thus, the finding is proposed as the present invention. That is, according to one embodiment of the present invention, there is provided a glass sheet for producing a glass-resin composite through integral combination with a resin sheet, the glass sheet comprising as a glass composition, in terms of mol %, 40% to 80% of $SiO_2$, 5% to 30% of $Al_2O_3$, 0% to 20% of $Li_2O+Na_2O+K_2O$, 3% to 35% of MgO, and 0% to 15% of CaO+SrO+BaO. Herein, the content of "$Li_2O+Na_2O+K_2O$" refers to the total content of $Li_2O$, $Na_2O$, and $K_2O$. The content of "CaO+SrO+BaO" refers to the total content of CaO, SrO, and BaO.

The glass sheet according to the one embodiment of the present invention comprises as a glass composition, in terms of mol %, 40% to 80% of $SiO_2$, 5% to 30% of $Al_2O_3$, more than 0% to 25% of $B_2O_3+P_2O_5$, 0% to 15% of $B_2O_3$, 0% to 15% of $P_2O_5$, more than 0% to 20% of $Li_2O+Na_2O+K_2O$, 3% to 35% of MgO, and 0% to 15% of CaO+SrO+BaO, and satisfies a relationship of 0<molar ratio $(Li_2O+Na_2O+K_2O)/(B_2O_3+P_2O_5)$≤1.5. Herein, the content of "$B_2O_3+P_2O_5$" refers to the total of $B_2O_3$ and $P_2O_5$. The content of "$Li_2O+Na_2O+K_2O$" refers to the total content of $Li_2O$, $Na_2O$, and $K_2O$. The content of "CaO+SrO+BaO" refers to the total content of CaO, SrO, and BaO. The molar ratio "$(Li_2O+Na_2O+K_2O)/(B_2O_3+P_2O_5)$" refers to a value obtained by dividing the total content of $Li_2O$, $Na_2O$, and $K_2O$ by the total content of $B_2O_3$ and $P_2O_5$.

The glass sheet according to the one embodiment of the present invention is a glass sheet for producing a glass-resin composite through integral combination with a resin sheet. In the glass-resin composite, the glass sheet has transparency and is formed of a material for increasing impact resistance. The resin sheet is formed of a material for alleviating an impact caused by collision with a scattered piece, and preventing scattering of a glass piece caused by the impact of the scattered piece. When both the constituents are incorporated, impact resistance performance is easily ensured.

The inventors of the present invention have analyzed collision with a scattered piece in detail. As a result, it has been found that, first, the glass sheet is broken due to an impact wave caused by collision with a scattered piece, and then the scattered piece penetrates through the glass sheet. In addition, it has been found that, when the impact wave caused by the collision with the scattered piece is dispersed, collision energy with the scattered piece is attenuated, and the scattered piece can be prevented from penetrating through the glass sheet. The inventors of the present invention have further analyzed the impact wave in detail. As a result, it has been found that, when the impact wave is dispersed in a moving direction of the scattered piece and in a perpendicular direction thereto to be attenuated, the speed of the impact wave is increased in proportion to the Young's modulus of the glass sheet. In view of the foregoing, the glass sheet according to the one embodiment of the present invention has the above-mentioned glass composition, particularly comprises 3 mol % or more of MgO in the glass composition, and thus can be increased in Young's modulus. With this, when the glass sheet collides with a scattered piece, an impact wave dispersion region is expanded, and the energy of the impact wave is highly absorbed, with the result that the speed of the scattered piece itself can be effectively reduced. Consequently, the scattered piece hardly penetrates through the glass sheet.

FIG. 1 is a schematic view for illustrating an example of a glass-resin composite. A glass-resin composite 10 comprises a glass sheet 11, a glass sheet 12, and a resin sheet 13 in the stated order from an external side, and these components each have a curved shape which is three-dimensionally curved and are integrally combined with each other via an organic resin intermediate layer (not shown). The glass sheet 11 comprises as a glass composition, in terms of mol %, 40% to 80% of $SiO_2$, 5% to 30% of $Al_2O_3$, 0% to 20% of $Li_2O+Na_2O+K_2O$, 3% to 35% of MgO, and 0% to 15% of CaO+SrO+BaO, and similarly, the glass sheet 12 comprises as a glass composition, in terms of mol %, 45% to 80% of $SiO_2$, 5% to 30% of $Al_2O_3$, 0% to 20% of $Li_2O+Na_2O+K_2O$, 3% to 35% of MgO, and 0% to 15% of CaO+SrO+BaO. Alternatively, the glass sheet 11 comprises as a glass composition, in terms of mol %, 40% to 80% of $SiO_2$, 5% to 30% of $Al_2O_3$, more than 0% to 25% of $B_2O_3+P_2O_5$, 0% to 15% of $B_2O_3$, 0% to 15% of $P_2O_5$, more than 0% to 20% of $Li_2O+Na_2O+K_2O$, 3% to 35% of MgO, and 0% to 15% of CaO+SrO+BaO, and satisfies a relationship of 0<molar ratio $(Li_2O+Na_2O+K_2O)/(B_2O_3+P_2O_5) \leq 1.5$, and similarly, the glass sheet 12 comprises as a glass composition, in terms of mol %, 40% to 80% of $SiO_2$, 5% to 30% of $Al_2O_3$, more than 0% to 25% of $B_2O_3+P_2O_3$, 0% to 15% of $B_2O_3$, 0% to 15% of $P_2O_5$, more than 0% to 20% of $Li_2O+Na_2O+K_2O$, 3% to 35% of MgO, and 0% to 15% of CaO+SrO+BaO, and satisfies a relationship of 0<molar ratio $(Li_2O+Na_2O+K_2O)/(B_2O_3+P_2O_5) \leq 1.5$. The resin sheet 13 comprises a polycarbonate.

In addition, it is preferred that the glass sheet according to the one embodiment of the present invention have a Young's modulus of 80 GPa or more. With this, the speed of the impact wave is increased in the glass sheet, and hence the impact wave dispersion region is expanded, with the result that the collision energy with a scattered object can be significantly attenuated. Herein, the "Young's modulus" refers to a value measured by a well-known resonance method.

In addition, it is preferred that the glass sheet according to the one embodiment of the present invention have a crack resistance of 500 gf or more. With this, the glass sheet is less liable to be flawed, and hence a reduction in impact resistance caused by flaws can be prevented. In addition, a reduction in transparency caused by flaws can also be prevented. Herein, the "crack resistance" refers to a load at which a crack occurrence rate is 50%. The "crack occurrence rate" refers to a value measured as described below. First, a Vickers indenter set to a predetermined load is pressed into a glass surface (optically polished surface) for 15 seconds in a constant temperature and humidity chamber retained at a humidity of 30% and a temperature of 25° C., and 15 seconds later, the number of cracks generated from the four corners of an indentation is counted (the maximum number of cracks is 4 per one indentation). The indenter is pressed in this way 20 times, the total number of generated cracks is determined, and then the crack occurrence rate is determined by the expression: (total number of generated cracks/80)×100.

In addition, it is preferred that the glass sheet according to the one embodiment of the present invention have a viscosity at 800° C. of $10^{12}$ dPa·s or less. With this, the glass sheet is easily subjected to curving work.

In addition, it is preferred that the glass sheet according to the one embodiment of the present invention have a crystallinity of 30% or less. With this, the curving workability of the glass sheet can be improved. Herein, the "crystallinity" refers to a value determined as described below. XRD is measured by a powder method, and a halo area corresponding to a mass of an amorphous component and a peak area corresponding to a mass of a crystalline component are calculated, and then the crystallinity is determined by the expression: [peak area]×100/[peak area+halo area] (%).

In addition, it is preferred that the glass sheet according to the one embodiment of the present invention have a thickness of from 3 mm to 15 mm.

In addition, it is preferred that the glass sheet according to the one embodiment of the present invention have a curved shape which is three-dimensionally curved. With this, the glass sheet is easily applied to, for example, a windshield of an automobile.

BRIEF DESCRIPTION OF DRAWINGS

FIG. 1 is a schematic view for illustrating an example of a glass-resin composite.

DESCRIPTION OF EMBODIMENTS

A glass sheet of the present invention comprises as a glass composition, in terms of mol %, 40% to 80% of $SiO_2$, 5% to 30% of $Al_2O_3$, 0% to 20% of $Li_2O+Na_2O+K_2O$, 3% to 35% of MgO, and 0% to 15% of CaO+SrO+BaO. Alternatively, the glass sheet of the present invention comprises as a glass composition, in terms of mol %, 40% to 80% of $SiO_2$, 5% to 30% of $Al_2O_3$, more than 0% to 25% of $B_2O_3+P_2O_5$, 0% to 15% of $B_2O_3$, 0% to 15% of $P_2O_5$, more than 0% to 20% of $Li_2O+Na_2O+K_2O$, 3% to 35% of MgO, and 0% to 15% of CaO+SrO+BaO, and satisfies a relationship of 0<molar ratio $(Li_2O+Na_2O+K_2O)/(B_2O_3+P_2O_5) \leq 1.5$. The reasons why the content range of each component is limited as described above are described below. In the description of the content range of each component, the expression "%" means "mol %".

$SiO_2$ is a component which forms a glass network. The content of $SiO_2$ is preferably from 40% to 80%, from 45% to 80%, or from 52% to 75%, particularly preferably from 58% to 72%. When the content of $SiO_2$ is too small, vitrification does not occur easily, and weather resistance is liable to be reduced. Meanwhile, when the content of $SiO_2$ is too large, meltability and formability are liable to be reduced. In addition, a thermal expansion coefficient becomes too low, with the result that it becomes difficult to match the thermal expansion coefficient with those of a resin sheet and an organic resin intermediate layer. When mismatch in expansion between the glass sheet and the resin sheet occurs, the resin sheet is liable to be deformed.

$Al_2O_3$ is a component which increases a Young's modulus and the weather resistance. The content of $Al_2O_3$ is preferably from 5% to 30%, from 9% to 25%, or from 15 to 24%, particularly preferably from 18% to 23%. When the content of $Al_2O_3$ is too small, the above-mentioned effects are hardly obtained. Meanwhile, when the content of $Al_2O_3$ is too large, the meltability, the formability, and the devitrification resistance are liable to be reduced.

The content of $B_2O_3+P_2O_5$ is preferably from more than 0% to 25% or from 1% to 10%, particularly preferably from 2% to 8%. When the content of $B_2O_3+P_2O_5$ is too small, the meltability, the formability, and curving workability are liable to be reduced. When the content of $B_2O_3+P_2O_5$ is too large, the weather resistance is liable to be reduced.

$B_2O_3$ is a component which increases the meltability, the formability, the curving workability, and crack resistance. The content of $B_2O_3$ is preferably from 0% to 20%, from 0% to 15% from 0% to 10%, or from 0% to 1%, particularly preferably from 0% to less than 0.1%. When the content of $B_2O_3$ is too large, the Young's modulus and the weather resistance are liable to be reduced.

$P_2O_5$ is a component which increases the meltability, the formability, and the curving workability. The content of $P_2O_5$ is preferably from 0% to 15% or from 1% to 12%, particularly preferably from 2% to 10%. When the content of $P_2O_5$ is too large, the weather resistance is liable to be reduced.

$Li_2O$, $Na_2O$, and $K_2O$ are each a component which reduces a viscosity at high temperature to increase the meltability, the formability, and the curving workability. The total content of $Li_2O$, $Na_2O$, and $K_2O$ is preferably from 0% to 20%, from more than 0% to 20%, or from 1% to 15%, particularly preferably from 5% to 12%. The content of each of $Li_2O$ and $K_2O$ is preferably from 0% to 15% or from 0% to 3%, particularly preferably from 0% to less than 1%. The content of $Na_2O$ is preferably from 0% to 15% or from 1% to 12%, particularly preferably from 3% to 10%. When the content of $Li_2O$, $Na_2O$, and $K_2O$ is too large, the Young's modulus, the crack resistance, and the weather resistance are liable to be reduced. When the content of $Li_2O$ is too large, the glass is liable to be devitrified during curving work.

The molar ratio $(Li_2O+Na_2O+K_2O)/(B_2O_3+P_2O_5)$ is preferably from more than 0 to 1.5, from 0.1 to 1.2, or from 0.5 to 1.1, particularly preferably from 0.9 to 1.0. When the molar ratio $(Li_2O+Na_2O+K_2O)/(B_2O_3+P_2O_5)$ is too small, the curving workability is liable to be reduced. Meanwhile, when the molar ratio $(Li_2O+Na_2O+K_2O)/(B_2O_3+P_2O_5)$ is too large, the Young's modulus and/or the crack resistance is liable to be reduced.

MgO is a component which significantly increases the Young's modulus and the crack resistance, and is also a component which reduces the viscosity at high temperature to increase the meltability, the formability, and the curving workability. The content of MgO is preferably from 3% to 35%, from 8% to 33%, or from 12% to 32%, particularly preferably from 15% to 30%. When the content of MgO is too small, it becomes difficult to exhibit the above-mentioned effects. Meanwhile, when the content of MgO is too large, the devitrification resistance is liable to be reduced.

CaO, SrO, and BaO are each a component which reduces the viscosity at high temperature to increase the meltability, the formability, and the curving workability. The total content of CaO, SrO, and BaO is preferably from 0% to 15% or from 0% to 5%, particularly preferably from 0% to less than 1%. The content of each of CaO, SrO, and BaO is preferably from 0% to 12%, from 0% to 5%, or from 0% to 2%, particularly preferably from 0% to less than 1%. When the content of CaO, SrO, and BaO is too large, the devitrification resistance, the Young's modulus, the crack resistance, and the like are liable to be reduced.

From the viewpoint of increasing the Young's modulus and the crack resistance, a molar ratio MgO/(MgO+CaO+SrO+BaO) is preferably 0.5 or more, 0.7 or more, or 0.8 or more, particularly preferably 0.9 or more. The molar ratio "MgO/(MgO+CaO+SrO+BaO)" refers to a value obtained by dividing the content of MgO by the total content of MgO, CaO, SrO, and BaO.

For example, the following components other than the above-mentioned components may be added.

$TiO_2$ is a component which increases the weather resistance, but is also a component which colors glass. Therefore, the content of $TiO_2$ is preferably from 0% to 0.5%, particularly preferably from 0% to less than 0.1%.

$ZrO_2$ is a component which increases the Young's modulus and the weather resistance, but is also a component which reduces the devitrification resistance. Therefore, the content of $ZrO_2$ is preferably from 0% to 0.5%, particularly preferably from 0% to less than 0.1%.

As a fining agent, one kind or two or more kinds selected from the group consisting of $SnO_2$, Cl, $SO_3$, and $CeO_2$ (preferably $SnO_2$ and/or $SO_3$) may be added at from 0.05% to 0.5%.

$Fe_2O_3$ is a component which is inevitably mixed in glass raw materials as an impurity, and is also a coloring component. Therefore, the content of $Fe_2O_3$ is preferably 0.5% or less, particularly preferably from 0.01% to 0.07%.

$V_2O_5$, $Cr_2O_3$, $CoO_3$, and NiO are each a coloring component. Therefore, the content of each of $V_2O_5$, $Cr_2O_3$, $CoO_3$, and NiO is preferably 0.1% or less, particularly preferably less than 0.01%.

A rare earth oxide, such as $Nd_2O_3$ or $La_2O_3$, is a component which increases the Young's modulus. However, the cost of the raw material itself is high, and when the rare earth oxide is added in a large amount, the devitrification resistance is liable to be reduced. Therefore, the total content of the rare earth oxides is preferably 3% or less, 1% or less, or 0.5% or less, particularly preferably 0.1% or less.

It is preferred that the glass sheet be substantially free of $As_2O_3$, $Sb_2O_3$, PbO, $Bi_2O_3$, and F as a glass composition from the standpoint of environmental considerations. The "substantially free of" as used herein has a general meaning that a case in which the explicit component is not positively added as a glass component, but is mixed as an impurity is permitted, and specifically refers to a case in which the content of the explicit component is less than 0.05%.

The glass sheet of the present invention preferably has the following characteristics.

The Young's modulus is preferably 80 GPa or more, 85 GPa or more, or 90 GPa or more, particularly preferably from 95 GPa to 150 GPa. When the Young's modulus is too low, the speed of an impact wave caused by collision with a scattered piece is reduced, and hence the impact wave is expanded only in a narrow region, with the result that it becomes difficult to attenuate collision energy with the scattered piece.

The crack resistance is preferably 500 gf or more, 800 gf or more, or 1,000 gf or more, particularly preferably from 1,200 gf to 5,000 gf. When the crack resistance is too low, the glass sheet is liable to be flawed, and the impact resistance and the transparency of the glass sheet are liable to be reduced owing to flaws.

The crystallinity is preferably 30% or less, 10% or less, 5% or less, or 1% or less, particularly preferably 0%, that is, amorphous. When the crystallinity is too high, the curving workability is liable to be reduced.

The glass sheet has a thickness of preferably 15 mm or less, 12 mm or less, or 10 mm or less, particularly preferably 8 mm or less, and preferably 1.5 mm or more, 3 mm or more, 4 mm or more, 5 mm or more, or 6 mm or more, particularly preferably 7 mm or more. When the thickness of the glass sheet is too small, it becomes difficult to ensure impact resistance performance. Meanwhile, when the thickness of the glass sheet is too large, the thinning of a window glass becomes difficult, and the visibility is liable to be reduced. In addition, the weight of the window glass is increased, and automobile fuel consumption or the like is increased.

The glass sheet of the present invention is a glass sheet for producing a glass-resin composite through integral combination with a resin sheet. The glass-resin composite preferably comprises a plurality of glass sheets. When the glass-resin composite comprises a plurality of glass sheets, a glass sheet (for example, a soda glass sheet) other than the glass sheet of the present invention may be incorporated therein. From the viewpoint of appropriately exhibiting the effects of the present invention, it is preferred that all glass sheets are the glass sheets of the present invention.

The glass-resin composite may comprise a plurality of resin sheets, but from the viewpoint of increasing visibility, the number of resin sheets is preferably one. Various resins, such as an acrylic and a polycarbonate, may be used for the resin sheet. Of those, a polycarbonate is particularly preferred from the viewpoints of transparency, impact alleviating properties, and weight saving.

The thickness of the resin sheet is preferably 10 mm or less, 8 mm or less, 7 mm or less, or 6 mm or less, particularly preferably 5 mm or less, and is preferably 0.5 mm or more, 0.7 mm or more, 1 mm or more, or 2 mm or more, particularly preferably 3 mm or more. When the thickness of the resin sheet is too small, it becomes difficult to alleviate the impact caused by the collision with the scattered piece. Meanwhile, when the thickness of the resin sheet is too large, the thinning of the window glass becomes difficult, and the visibility of the window glass is liable to be reduced.

In the glass-resin composite, it is preferred that the glass sheets, and the glass sheet and the resin sheet be integrally combined with each other via an organic resin intermediate layer. The thickness of the organic resin intermediate layer is preferably from 0.1 mm to 2 mm, from 0.3 mm to 1.5 mm, or from 0.5 mm to 1.2 mm, particularly preferably from 0.6 mm to 0.9 mm. When the thickness of the organic resin intermediate layer is too small, energy of an impact wave is liable to be propagated to an indoor side at the time of collision with a scattered piece. Meanwhile, when the thickness of the organic resin intermediate layer is too large, the visibility of a window glass is liable to be reduced.

It is preferred that the thermal expansion coefficient of the organic resin intermediate layer be equal to or higher than the thermal expansion coefficient of the glass sheet, and be also equal to or lower than the thermal expansion coefficient of the resin sheet. With this, when the window glass is heated by direct sunlight, the glass sheet and the resin sheet are less liable to be separated and deformed. The "thermal expansion coefficient" refers to an average linear thermal expansion coefficient within a temperature range of from 0° C. to 300° C.

As the organic resin intermediate layer, various organic resins may be used. For example, polyethylene (PE), an ethylene-vinyl acetate copolymer (EVA), polypropylene (PP), polystyrene (PS), a methacrylic resin (PMA), polyvinyl chloride (PVC), polyethylene terephthalate (PET), polybutylene terephthalate (PBT), cellulose acetate (CA), a diallyl phthalate resin (DAP), a urea resin (UP), a melamine resin (MF), an unsaturated polyester (UP), polyvinyl butyral (PVB), polyvinyl formal (PVF), polyvinyl alcohol (PVAL), a vinyl acetate resin (PVAc), an ionomer (IO)), polymethylpentene (TPX), vinylidene chloride (PVDC), polysulfone (PSF), polyvinylidene fluoride (PVDF), a methacrylic-styrene copolymer resin (MS), polyarylate (PAR), polyarylsulfone (PASF), polybutadiene (BR), polyethersulfone (PESF), or polyether ether ketone (PEEK) may be used. Of those, from the viewpoints of transparency and fixability, EVA and PVB are suitable, and PVB is particularly preferred because of being capable of imparting a sound insulation property.

A colorant, or an absorber for absorbing light at a specific wavelength, such as infrared light or ultraviolet light, may be added to the organic resin intermediate layer.

A combination of a plurality of kinds of the above-mentioned organic resins may be used for the organic resin intermediate layer. For example, when a double-layered organic resin intermediate layer is used for integrally combining the glass sheet and the resin sheet, the glass sheet and the resin sheet are fixed to each other via different organic resins, with the result that warpage of the window glass is easily reduced.

The total thickness of the glass-resin composite is preferably 55 mm or less, 45 mm or less, or 40 mm or less, and is preferably 4 mm or more, 5 mm or more, or 7 mm or more, particularly preferably 10 mm or more. When the total thickness of the glass-resin composite is too small, the impact resistance performance of the window glass is liable to be reduced. Meanwhile, when the total thickness of the glass-resin composite is too large, the weight of the window glass is increased, and the visibility of the window glass is liable to be reduced.

The glass sheet may be produced as described below.

First, glass raw materials having been blended so as to give a predetermined glass composition are loaded into a continuous melting furnace and melted by heating at from 1,500° C. to 1,700° C. The contents are fined and stirred, and then fed to a forming apparatus to be formed into a sheet shape, followed by annealing. Thus, a glass sheet can be produced.

As a forming method for the glass sheet, a float method is preferably adopted. The float method is a method capable of producing the glass sheet at low cost.

Other than the float method, an overflow down-draw method may be adopted. The overflow down-draw method is a method by which a thin glass sheet having a surface in an unpolished state can be produced in a large amount. When the glass sheet has an unpolished surface, the production cost of the glass sheet can be reduced.

The glass sheet is preferably subjected to chamfering processing as required. In this case, C chamfering processing with a #800 metal bond abrasive or the like is preferably performed. With this, strength on an end surface can be increased. It is also preferred to subject an end surface of the glass sheet to etching to reduce crack sources present on the end surface, as required.

Next, the resultant glass sheet is subjected to curving work as required. Various methods may be adopted as a method for the curving work. In particular, a method involving press forming glass sheets with a mold one by one or as a laminate is preferred. The method preferably involves causing the glass sheet to pass through a heat treatment furnace under a state of being sandwiched in a mold having a predetermined shape. With this, dimensional accuracy of a curved shape can be increased. In addition, a method involving arranging glass sheets on a mold having a predetermined shape one by one or as a laminate, followed by subjecting part or the entirety of the glass sheets to heat treatment, to thereby soften and deform the glass sheets under their own weight along the shape of the mold is also preferred. With this, the efficiency of the curving work can be increased.

Next, the glass sheet (preferably a plurality of glass sheets) and the resin sheet are integrally combined with each other via the organic resin intermediate layer. Thus, the glass-resin composite can be produced. As a method for the integral combination, there are given, for example: a method involving pouring an organic resin between the glass sheets or between the glass sheet and the resin sheet, followed by curing the organic resin; and a method involving arranging an organic resin sheet between the glass sheets or between the glass sheet and the resin sheet, followed by subjecting the organic resin sheet to pressure and heat treatment (heat pressure bonding). The former method enables suppression of deformation of the resin sheet caused by mismatch in expansion between the glass sheet and the resin sheet. The latter method facilitates the integral combination.

In addition, after the integral combination, a functional film, such as a hard coat film, an infrared reflective film, or a heat reflective film, may be formed on an outer surface of the outermost glass sheet. In addition, before the integral combination, a functional film, such as a hard coat film, an infrared reflective film, or a heat reflective film, may be formed on an inner surface of the outermost glass sheet.

EXAMPLES

The present invention is hereinafter described in detail by way of Examples. However, Examples below are merely examples, and the present invention is by no means limited to Examples below.

Examples (Sample Nos. 1 to 6) and Comparative Examples (Sample Nos. 7 to 9) of the present invention are shown in Table 1. Examples (Sample Nos. 10 to 14) and Comparative Examples (Sample Nos. 15 to 17) of the present invention are shown in Table 2. The "N.A." in the table means that the item is not measured.

TABLE 1

| | | No. 1 | No. 2 | No. 3 | No. 4 | No. 5 | No. 6 | No. 7 | No. 8 | No. 9 |
|---|---|---|---|---|---|---|---|---|---|---|
| Glass composition (mol %) | $SiO_2$ | 69.8 | 59.9 | 49.9 | 67.5 | 60.0 | 52.5 | 69.8 | 59.8 | 72.0 |
| | $Al_2O_3$ | 10.0 | 20.0 | 30.0 | 22.5 | 20.0 | 17.5 | 10.0 | 20.0 | 1.0 |
| | $Li_2O$ | 0.0 | 0.0 | 0.0 | 0.0 | 0.0 | 0.0 | 0.0 | 0.0 | 0.0 |
| | $Na_2O$ | 5.1 | 5.0 | 5.0 | 0.0 | 0.0 | 0.0 | 5.0 | 5.0 | 14.0 |
| | $K_2O$ | 0.0 | 0.0 | 0.0 | 0.0 | 0.0 | 0.0 | 0.0 | 0.0 | 0.0 |
| | MgO | 15.0 | 15.0 | 15.0 | 10.0 | 20.0 | 30.0 | 0.0 | 0.0 | 2.0 |
| | CaO | 0.0 | 0.0 | 0.0 | 0.0 | 0.0 | 0.0 | 0.0 | 0.0 | 11.0 |
| | SrO | 0.0 | 0.0 | 0.0 | 0.0 | 0.0 | 0.0 | 0.0 | 0.0 | 0.0 |
| | BaO | 0.0 | 0.0 | 0.0 | 0.0 | 0.0 | 0.0 | 15.0 | 15.0 | 0.0 |
| | $SnO_2$ | 0.1 | 0.1 | 0.1 | 0.0 | 0.0 | 0.0 | 0.2 | 0.2 | 0.0 |
| $Li_2O + Na_2O + K_2O$ | | 5.1 | 5.0 | 5.0 | 0.0 | 0.0 | 0.0 | 5.0 | 5.0 | 14.0 |
| CaO + SrO + BaO | | 0.0 | 0.0 | 0.0 | 0.0 | 0.0 | 0.0 | 15.0 | 15.0 | 11.0 |
| Young's modulus (GPa) | | 82 | 92 | 101 | 96 | 101 | 105 | 73 | 78 | 68 |
| Crack resistance (gf) | | 1,200 | 1,160 | 1,650 | 4,250 | 1,500 | 800 | 80 | 80 | 200 |
| Glass transition temperature (° C.) | | 738 | 753 | 765 | 832 | 819 | 795 | 651 | 810 | 520 |
| Crystallinity (%) | | 0 | 0 | 0 | 0 | 0 | 0 | 0 | 0 | 0 |

TABLE 2

| | | No. 10 | No. 11 | No. 12 | No. 13 | No. 14 | No. 15 | No. 16 | No. 17 |
|---|---|---|---|---|---|---|---|---|---|
| Glass composition (mol %) | $SiO_2$ | 45.1 | 51.3 | 55.4 | 54.2 | 56.4 | 59.9 | 47.2 | 72.0 |
| | $Al_2O_3$ | 22.6 | 18.6 | 18.4 | 18.1 | 18.8 | 4.9 | 2.5 | 1.0 |
| | $B_2O_3$ | 0.0 | 0.0 | 6.6 | 3.4 | 0.0 | 15.0 | 0.0 | 0.0 |
| | $P_2O_5$ | 6.8 | 4.7 | 0.0 | 3.4 | 2.9 | 0.0 | 0.0 | 0.0 |
| | $Li_2O$ | 2.7 | 0.0 | 0.9 | 2.7 | 2.8 | 0.0 | 8.9 | 0.0 |
| | $Na_2O$ | 0.0 | 1.9 | 0.0 | 0.0 | 0.0 | 10.0 | 7.2 | 14.0 |
| | $K_2O$ | 0.0 | 0.0 | 0.0 | 0.0 | 0.0 | 0.0 | 4.0 | 0.0 |
| | MgO | 22.6 | 23.3 | 18.4 | 18.1 | 18.8 | 10.0 | 0.0 | 0.0 |
| | CaO | 0.0 | 0.0 | 0.0 | 0.0 | 0.0 | 0.0 | 11.3 | 0.0 |
| | SrO | 0.0 | 0.0 | 0.0 | 0.0 | 0.0 | 0.0 | 8.2 | 0.0 |
| | BaO | 0.0 | 0.0 | 0.0 | 0.0 | 0.0 | 0.0 | 7.5 | 0.0 |
| | $ZrO_2$ | 0.0 | 0.0 | 0.0 | 0.0 | 0.0 | 0.0 | 3.2 | 0.0 |
| | $SnO_2$ | 0.2 | 0.2 | 0.3 | 0.1 | 0.3 | 0.2 | 0.0 | 0.0 |
| $B_2O_3 + P_2O_5$ | | 6.8 | 4.7 | 6.6 | 6.8 | 2.9 | 15.0 | 0.0 | 0.0 |
| $Li_2O + Na_2O + K_2O$ | | 2.7 | 1.9 | 0.9 | 2.7 | 2.8 | 10.0 | 20.1 | 14.0 |
| $(Li_2O + Na_2O + K_2O)/(B_2O_3 + P_2O_5)$ | | 0.4 | 0.4 | 0.1 | 0.4 | 1.0 | 0.7 | ∞ | ∞ |
| CaO + SrO + BaO | | 0.0 | 0.0 | 0.0 | 0.0 | 0.0 | 0.0 | 27.0 | 0.0 |
| Glass transition temperature (° C.) | | N.A. | N.A. | N.A. | N.A. | N.A. | N.A. | N.A. | 520 |
| Young's modulus (GPa) | | 96 | 94 | 97 | 91 | 97 | 70 | 93 | 68 |
| Crack resistance (gf) | | 2,900 | 1,800 | 2,800 | 3,200 | 1,900 | 1,900 | 50 | 200 |
| Viscosity $log\eta_{800° C.}$ (dPa · s) | | 10 | 11 | 10 | 10 | 11 | 7 | 3 | 7 |
| Crystallinity (%) | | 0 | 0 | 0 | 0 | 0 | 0 | 0 | 0 |

A glass sheet was produced as described below. Glass raw materials were blended so as to provide a glass sheet shown in Table 1 or Table 2. Next, the glass batch having been blended was loaded into a continuous melting furnace and melted at 1,600° C. for 20 hours. After that, the contents were fined and stirred to provide homogeneous molten glass. The molten glass was formed into a sheet shape having a thickness of 8.0 mm. The resultant glass sheet was evaluated for a Young's modulus, a crack resistance, a glass transition temperature, and a crystallinity. In addition, Sample Nos. 10 to 17 were each further evaluated for a viscosity at 800° C. (log $\eta_{800° C.}$). The glass sheets according to Sample Nos. 1 to 17 each had a mixed impurity amount of 0.05 mol % for $Fe_2O_3$, and a mixed impurity amount of less than 0.01 mol % for each of $V_2O_5$, $Cr_2O_3$, $CoO_3$, and NiO.

The Young's modulus is a value measured by a well-known resonance method.

The crack resistance refers to a load at which a crack occurrence rate is 50%. The crack occurrence rate was measured as described below. First, a Vickers indenter set to a predetermined load is pressed into a glass surface (optically polished surface) for 15 seconds in a constant temperature and humidity chamber retained at a humidity of 30% and a temperature of 25° C., and 15 seconds later, the number of cracks generated from the four corners of an indentation is counted (the maximum number of cracks is 4 per one indentation). The indenter was pressed in this way 20 times, the total number of generated cracks was determined, and then the crack occurrence rate was determined by the expression: (total number of generated cracks/80)×100.

The glass transition temperature is a value measured with a dilatometer.

The crystallinity refers to a value determined as described below. XRD is measured by a powder method, and a halo area corresponding to a mass of an amorphous component and a peak area corresponding to a mass of a crystalline component are calculated, and then the crystallinity is determined by the expression: [peak area]×100/[peak area+halo area] (%). A crystallinity of 0% means that the glass sheet is formed of amorphous glass.

The viscosity at 800° C. (log $\eta_{800° C.}$) is a value determined from an interpolation value for a temperature-viscosity curve obtained from the temperatures of a strain point, an annealing point, and a softening point. The strain point and the annealing point are values each measured by the method specified in ASTM C336. In addition, the softening point is a value measured by the method specified in ASTM C338.

As is apparent from Table 1, each of Sample Nos. 1 to 6 has a high Young's modulus, and a low glass transition point and a low crystallinity, and hence has high impact resistance performance and is easily subjected to curving work. Therefore, it is considered that each of Sample Nos. 1 to 6 is suitable as a glass sheet for producing a glass-resin composite through integral combination with a resin sheet. Meanwhile, each of Sample Nos. 7 to 9 has a low Young's modulus. Therefore, it is considered that each of Sample Nos. 7 to 9 has low impact resistance performance.

As is apparent from Table 2, each of Sample Nos. 10 to 14 has a Young's modulus of 91 GPa or more and a viscosity at 800° C. of $10^{11}$ dPa·s or less. Therefore, it is considered that each of Sample Nos. 10 to 14 is suitable as a glass sheet for producing a glass-resin composite through integral combination with a resin sheet. Meanwhile, each of Sample Nos. 15 and 17 has a low Young's modulus. Therefore, it is considered that each of Sample Nos. 15 and 17 has low impact resistance. Sample No. 16 has low crack resistance. Therefore, it is considered that Sample No. 16 has low impact resistance owing to flaws.

Next, the glass sheet according to Sample No. 1 was passed through a heat treatment furnace under a state of being sandwiched in a mold having a predetermined shape. Thus, the glass sheet was subjected to curving work to be formed into a curved shape in which the glass sheet was curved in an arc shape in its entirety in a width direction and curved in an arc shape in its entirety in a length direction. After that, an end surface of the glass sheet after the curving work was subjected to C chamfering processing with a #800 metal bond abrasive and to polishing processing.

Subsequently, a polycarbonate sheet (thickness: 4.0 mm) having the same curved shape as the glass sheet was prepared.

Finally, the glass sheet according to Sample No. 1 (outer glass sheet), polyvinyl butyral (PVB) having a thickness of 0.8 mm, the glass sheet according to Sample No. 1 (inner glass sheet), polyvinyl butyral (PVB) having a thickness of 0.8 mm, and the polycarbonate sheet were integrally combined with each other in the stated order from an external side (atmosphere side) through autoclave treatment. Thus, a glass-resin composite according to Sample No. 1 was obtained. The same experiment was performed for each of Sample Nos. 2 to 6 and 10 to 14, and glass-resin composites according to Sample Nos. 2 to 6 and 10 to 14 were obtained.

INDUSTRIAL APPLICABILITY

The glass sheet of the present invention is suitable as a glass sheet for producing a glass-resin composite through integral combination with a resin sheet. The glass-resin composite is suitable as a window glass (particularly a windshield) of an automobile, a railway vehicle, an aircraft, or the like. Other than those applications, the glass-resin composite is also suitable as a window glass of a building, such as a high-rise building.

REFERENCE SIGNS LIST 10 glass-resin composite
11 glass sheet
12 glass sheet
13 resin sheet

The invention claimed is:

1. A glass-resin composite comprising:
a glass sheet; and
a resin sheet,
wherein the glass sheet comprises as a glass composition, in terms of mol %, 40% to 80% of $SiO_2$, 5% to 30% of $Al_2O_3$, 1% to 20% of $Li_2O+Na_2O+K_2O$, 15% to 35% of MgO, and 0% to 15% of CaO+SrO+BaO.

2. The glass-resin composite according to claim 1, wherein the glass sheet comprises as a glass composition, in terms of mol %, 40% to 80% of $SiO_2$, 5% to 30% of $Al_2O_3$, more than 0% to 25% of $B_2O_3+P_2O_5$, 0% to 15% of $B_2O_3$, 0% to 15% of $P_2O_5$, more than 1% to 20% of $Li_2O+Na_2O+K_2O$, 15% to 35% of MgO, and 0% to 15% of CaO+SrO+BaO, and satisfies a relationship of 0<molar ratio $(Li_2O+Na_2O+K_2O)/(B_2O_3+P_2O_5) \leq 1.5$.

3. The glass-resin composite according to claim 1, wherein the glass sheet has a Young's modulus of 80 GPa or more.

4. The glass-resin composite according to claim 1, wherein the glass sheet has a crack resistance of 500 gf or more.

5. The glass-resin composite according to claim 1, wherein the glass sheet has a viscosity at 800° C. of $10^{12}$ dPa·s or less.

6. The glass-resin composite according to claim 1, wherein the glass sheet has a crystallinity of 30% or less.

7. The glass-resin composite according to claim 1, wherein the glass sheet has a thickness of from 3 mm to 15 mm.

8. The glass-resin composite according to claim 1, wherein the glass sheet has a curved shape which is three-dimensionally curved.

9. The glass-resin composite according to claim 2, wherein the glass sheet has a Young's modulus of 80 GPa or more.

* * * * *